Patented Sept. 4, 1951

2,566,980

UNITED STATES PATENT OFFICE 2,566,980

PROCESS OF BREAKING WATER AND OIL EMULSIONS

Arthur E. Catanach and Ralph P. Gulley, Port Arthur, Tex., assignors to Gulf Oil Corporation, Pittsburgh, Pa., a corporation of Pennsylvania No Drawing. Application November 21, 1949,
Serial No. 128,684

17 Claims. (Cl. 252—330)

This invention relates to a process for breaking oil and water emulsions and more particularly to a process for effecting a more speedy and more complete separation of oil and water emulsions occurring in waste refinery waters.

Considerable attention has been focused on the problem of pollution of waterways by industrial concerns. Oil refineries are particularly concerned with these problems, since a certain amount of waste oil may be discharged into these waterways along with the waste refinery water. Consequently, it is desired to remove as much of this oil as possible from the waste refinery waters before discharging them into these local waterways. It is also advantageous to recover this waste oil for reasons of economy. In large refineries the amount of waste oil may run into many thousands of gallons per month. This oil, if reclaimed, may be distilled into kerosene, fuel oil and other commercially useful petroleum fractions. Consequently, in addition to the reasons relating to sanitation and pollution described above, a large economy may be effected by recovery of these waste oils.

Some of the sources from which waste oil may arise are as follows:

(1) oil rejected from various treating units or spilled in the refinery area;

(2) bottom settlings and water, commonly referred to as BS and W, from crude oil tanks;

(3) oil displaced from pipe lines during change-overs, spillage, leakage and the like;

(4) tank cleaning operations; and (5) oil present in waste treating reagents and cooling waters.

Many factors may contribute to produce extremely stable emulsions in waste refinery water, which emulsions can be broken by conventional processes only with difficulty or not at all. One well-known condition which tends to produce stable emulsions is the presence of salt in the waste water. Salt in the waste water is undesirable since it causes "salting out" of the mud contained in the waste refinery water. This mud then combines with the oil present in the waste refinery water to form a stable emulsion. Refinery cooling water, taken into the refinery from adjacent streams, often contains a rather large proportion of salt, particularly in refineries which are located in coastal regions and which are affected by fluctuating tide levels, or in refineries which are located downstream from other industrial plants.

In most oil-water emulsion breaking systems, whether chemical, mechanical, or electrical, the refinery waste waters from the sources described above are gathered into numerous outdoor settling basins through an integrated system of sewers. The waste oil and water are allowed to settle in these basins until a rough separation has taken place. At this stage the liquid contained in these ponds exists in an upper oil and oil-water emulsion layer and a lower aqueous layer. The upper layer or emulsion concentrate is then removed to a central waste disposal unit where it is subjected to an emulsion breaking treatment.

It has been known in one chemical emulsion breaking process to heat the emulsion and to add spent refinery caustic soda solution obtained from various refinery operations, whereby a separation of some degree occurs, at least in connection with the treatment of less stable emulsions. The use of spent caustic is desirable, not only from a standpoint of economy, since it involves no additonal cost, but also from a standpoint of efficiency, since spent caustic solution also contains certain compounds extracted from the various petroleum fractions, which compounds appear to possess detergent qualities and which are useful in breaking oil-water emulsions. However, the use of spent refinery caustic solution is unsatisfactory in the treatment of stable emulsions, such as those produced when the salt concentration of the waste refinery water becomes too high. Due to several factors, such as a large salt concentration in the waste water, the emulsions are either incompletely resolved or not broken at all. High salt concentration may be the result of low rainfall and evaporation, or in coastal refineries also may be due to high tides since under these conditions the salinity of the intake water at times approaches that of sea water. Under these circumstances it has been found that the water and oil emulsions formed in waste refinery water are too stable to be separated in the conventional manner. We have discovered that by properly adjusting the pH of the emulsion to be broken, a more speedy and more complete resolution of the emulsion may be brought about.

One object of this invention is to provide a more rapid and more effective method of breaking stable oil and water emulsions. Another object of this invention is to provide a process which will decrease pollution of waterways. A further object is to provide a method which will effect a more complete separation of oil and water emulsions without substantially increasing the cost of treatment. A still further object is to provide a process which will increase the yield of reclaimed oil which can then be converted to commercial uses. Other objects will appear obvious from the following description.

These objects are accomplished by our invention which comprises a process of breaking oil and water emulsions which includes the steps of adjusting the pH of the water contained in the emulsion to a value between 11 and 13 and agitating and heating of the mixture thus formed until the emulsion will break into separate oil and water phases after a short settling period, whereupon heating and agitating are discontinued, and the mixture is allowed to settle into separate oil and water layers. In one particularly preferred form of our invention, spent refinery caustic solution is employed to raise the pH of the water contained in the emulsion to the described value. In another particularly preferred modification of our invention, spent refinery caustic solution which has been pretreated by blowing steam and air therethrough is employed to raise the pH to the proper level. The process for pretreating the spent caustic solution will be described hereinafter but is set forth in greater detail in our copending application Serial No. 128,683 filed on November 21, 1949.

We have discovered that by adjusting the pH of the emulsion to be broken as described above, conditions are created which are most conducive to a rapid and complete resolution of the emulsion. While any alkaline substance may be used to adjust the pH to the described value, we prefer to employ spent caustic solution as the alkaline material, since the use of this material entails no additional cost. Furthermore, we have found that when spent refinery caustic solution which has been pretreated in the manner described herein and in our copending application is employed to adjust the pH, unusually improved results are produced.

In the following description certain preferred modifications of our invention are set forth. It is understood that these are by way of illustration only and are not to be considered limiting in any manner.

In carrying out our invention the emulsion concentrate is gathered from the surface of the settling basins as described above and conveyed to a central waste disposal unit, where the emulsion-breaking process is begun. The oil-water emulsion to be broken is placed in a container, and the pH of the water contained in the emulsion is adjusted to the proper value by adding thereto, preferably while agitating, a water-soluble basic material, preferably in aqueous solution. The emulsion is heated and agitated for a short time until experience indicates that the emulsion will resolve into separate oil and water phases after a short settling period.

In addition to reducing the viscosity of the system, the heat applied to the emulsion also increases the speed of motion of the emulsified particles and consequently increases the number of collisions between these particles. Furthermore, the emulsion heating step produces an expansion of the emulsified particles, thus tending to break the protective film around these particles. These three effects produced by the application of heat contribute to produce conditions favorable to the breaking of the emulsion.

Heating and agitating are then discontinued and the mixture is allowed to settle. The lower aqueous layer is drawn off and the oil is pumped to storage.

In a preferred form of our invention the emulsion concentrate obtained from the settling basin is preheated to about 200° F. by means of steam and air, following which the pH is adjusted to a value ranging from 11 to 13. The air is blown through the mixture and serves to agitate the emulsion. The steam may be passed through coils immersed in the emulsion or actually bubbled through the liquid mixture. After the desired temperature has been reached, spent caustic solution having a gravity of approximately 10° Bé. is added to the emulsion while continuing to agitate and heat. Sufficient spent refinery caustic solution is added to the mixture to produce a pH value of between 11 and 13. Heating and agitating of the mixture is then continued for about 30 minutes, after the total volume of the spent refinery caustic solution has been added. Following this step heating and agitating is discontinued and the mixture is allowed to separate into oil and water layers. The oil and water layers are drawn off separately. After the vessel is emptied, a new charge of emulsion is introduced into the vessel, and the entire process is repeated.

The following specific examples will serve to illustrate more clearly the advantages of our invention.

*Example I*

In each of the following plant scale runs, the data for which are collected in Table A below, the following procedure was observed:

The emulsion to be broken was heated to about 200° F. with steam and air, following which, spent caustic solution was added thereto. Agitating and heating was continued for about 30 minutes whereupon the heating and agitating was discontinued. The mixture was allowed to settle and the individual layers were drawn off and measured.

TABLE A

|  | Run 1 | Run 2 | Run 3 |
|---|---|---|---|
| Emulsion Charge, Bbls | 4,000 | 4,000 | 4,000 |
| Spent Caustic Soda, Bbls | 250 | 250 | 275 |
| ° Bé. of Caustic | 10 | 9 | 8 |
| Total Charge, Bbls | 4,250 | 4,250 | 4,275 |
| Yield, Bbls.: | | | |
| Clean Oil | 1,514 | 249 | 611 |
| Emulsion Middle Layer | 932 | 1,485 | 1,893 |
| Water | 1,804 | 2,516 | 1,771 |
| pH of Water | 10.0 | 9.0 | 9.0 |
| PPM NaCl | 700 | 8,000 | 6,100 |

*Example II*

In the following plant scale runs the identical procedure described in Example I was followed, except that in these runs, the data for which is collected in Table B below, spent refinery caustic solution was added, in an amount sufficient to produce a pH value ranging from 11 to 13.

TABLE B

|  | Run 1 | Run 2 | Run 3 |
|---|---|---|---|
| Emulsion Charge, Bbls | 4,000 | 4,000 | 4,000 |
| Spent Caustic Soda, Bbls | 250 | 250 | 275 |
| ° Bé. of Caustic | 10 | 10 | 9 |
| Total Charge, Bbls | 4,250 | 4,250 | 4,275 |
| Yield, Bbls.: | | | |
| Clean Oil | 1,456 | 1,881 | 1,466 |
| Emulsion Middle Layer | 0 | 0 | 0 |
| Water | 2,894 | 2,369 | 2,809 |
| pH of Water | 11.6 | 11.0 | 12.0 |
| PPM NaCl | 800 | 8,800 | 6,100 |

In each of the runs under Table A it will be noted that a substantial middle layer of emulsion remained after the completion of the process, indicating that the emulsion was incompletely resolved. In each of the runs in Table B no middle emulsion layer remained at the completion of the processes, thus illustrating that complete resolution of the emulsion had taken place.

As stated above, in one preferred modification of our invention, spent refinery caustic solution which has been pretreated by blowing steam and air therethrough may be employed in place of the untreated spent refinery caustic solution used in the examples above, in order to adjust the pH. A preferred procedure for pretreating the spent refinery caustic solution is carried out by simultaneously blowing steam and air through the spent refinery caustic solution at a temperature about 200° F. for about 5 hours. Normally, however, resort to the use of pretreated spent caustic is unnecessary except in the case of extremely stable emulsions.

The emulsion to be broken may be agitated and heated or not, as desired, prior to the adjustment of the pH. However, preheating is preferably employed. Where preheating is employed it may be carried out at temperatures other than those described in the foregoing description. As stated above the primary functions of the heating steps are to reduce the viscosity of the system, to increase the speed of motion of the emulsion and the consequent number of collisions thereof, and to cause an expansion of the emulsified particles. Consequently, a higher or lower temperature may be used depending upon the degree of stability of the particular emulsion being treated. Usually from about 150° to about 210° F. is preferred, with about 200° F. being particularly preferred. However, lower temperatures may be used but with a corresponding decrease in the speed and possibly in the completeness of the emusion breaking process. As indicated hereinbefore the pH may be adjusted while the emulsion is at room temperature, but greatly superior results are obtained when the emulsion is preheated to a temperature within the preferred range prior to adjustment of the pH. Temperatures above about 212° F. are not recommended where the heating is carried out in open vessels, since excessive foaming results. However, when the heating is carried out under pressure, higher temperatures may be used. In general, the increased expense and difficulty involved in the use of higher temperatures are not justified by the improvement in the results.

The sole purpose of the air employed in the primary heating of the emulsion is to agitate the mixture. It will be obvious that other means of agitation may be employed with equal success. Where preheating of the emulsion is employed, agitation is preferably begun prior to the addition of the alkaline agent and is continued along with heating until the settling period is reached. Where no preheating step is employed, the agitation is preferably begun no later than during the final heating.

As stated previously, any water-soluble basic material may be used to raise the pH of the water contained in the emulsion to the desired degree. Specific examples of such basic materials are sodium hydroxide, sodium carbonate, potassium hydroxide, potassium carbonate, etc. For reasons of economy the use of spent refinery caustic solution is preferred, since use of this material does not entail any additional cost.

The spent refinery caustic solution employed in our invention, whether pretreated or not, is obtained from various operations in the refinery and results primarily from the use of caustic soda solution for removal or reduction of hydrogen sulfide, mercaptans, and possibly certain other compounds from gasoline, kerosene, naphtha, gas, and other light products. It should be noted that spent "doctor" solution is not operative in this process since the lead sulfide contained therein would actually inhibit the breaking of the emulsion.

The concentration of the fresh caustic employed in refinery operations is such that the gravity thereof varies from about 5° Bé. to about 20° Bé. The concentration of the over-all spent caustic solution obtained from the washing of the materials listed above is usually such that the solution has a gravity ranging from 8° Bé to about 10° Bé. The use of spent caustic of these concentrations is preferred. In many instances, however, it occurs that the over-all concentration of the spent caustic solution may run as low as 2° Bé. to 3° Bé. Desirably the concentration of this solution is raised to the preferred level by intermixture with spent caustic having a gravity greater than 10° Bé. Fresh caustic also may be employed for this purpose. However, when stronger spent caustic is not available or when speed is essential, spent caustic having a gravity as low as 2° Bé. may be employed to adjust the pH of the water contained in the emulsion. In these instances a proportionately larger quantity of spent caustic than that normally required is necessary. The emulsion is preferably agitated during the addition of the alkaline material.

Our experience shows that a pH between the limits of 11 and 13 is most conducive to a rapid and complete resolution of the emulsion. Consequently, the pH should not be varied substantially from these values. Usually, about 2–10 per cent by volume of spent caustic solution is sufficient to produce the desired pH. Any appropriate indicator may be used to determine when the pH has been raised to the proper value. "Phydrion" indicator papers have been employed successfully by us. If more accurate determination of the pH is desired, a Macbeth or Beckman electrically operated pH meter may be employed.

After the addition of the spent refinery caustic soda solution or other alkaline material has been completed, the mixture is agitated and heated until the emulsion will separate into oil and water layers after a short settling period. Where the emulsion has been preheated before adjustment of the pH, as is preferred, agitation and heating are continued, the temperature being maintained between the limits described previously in connection with the preheating step. Where no preheating step has been employed, heating is begun after addition of the alkaline agent is complete, the temperature again corresponding to those described in connection with the preheating step. An inexperienced operator may determine the point at which the mixture is ready for settling by periodically withdrawing samples of the liquid mixture and observing the rate of settling. An experienced operator can determine this from the appearance of the mixture without making a settling test. In most instances a heating time of about 30 minutes is sufficient. However, in certain instances up to one and one-half hours or longer may be required. A settling time of about 30 minutes to 2 hours is usually sufficient for the treated emulsion to break completely into separate oil and water layers. However, in certain instances this time may be as long as six hours or more.

In certain instances it may be desired to employ pretreated spent caustic soda solution as the emulsion breaking agent. During the pretreating process steam and air are simultaneously blown through spent caustic solution preferably in the ratio varying from about 1 to 10 volumes of steam per volume of air, at a temperature of about 200° F., for about 5 hours. However, other pretreating temperatures may be used. In general, temperatures ranging from about 160° F. to about 235° F. or higher are satisfactory, with temperatures between about 160° F. and about 225° F. being preferred. Temperatures higher than about 225° F. may require the use of pressure heating, thus making the use of these temperatures less desirable. While the time of pretreatment is preferably about 5 hours this time may be considerably lower. In most cases a pretreating time of at least about 3 hours is desired. A pretreatment time of more than 5 hours may also be used.

While high salt concentration has been described as one of the factors which contributes to stable oil-water emulsions in waste refinery waters, it should be emphasized that any one of the described modifications of our process may be employed successfully in connection with any oil-water emulsion, regardless of the salt concentration, with improved results in the speed and completeness of the breaking of the emulsion.

One advantage of our invention is that it provides a method whereby the pollution of waterways may be substantially decreased. Another advantage produced by our process is that a substantially larger amount of waste oil may be reclaimed which may be converted to commercially desirable products. A further advantage of our process is that a more rapid and complete separation of the oil-water emulsion is produced without substantially increasing the cost.

By the term "spent caustic" employed in the foregoing description and in the appended claims we mean to include either slightly spent caustic soda solution or up to 95 per cent spent caustic soda solution, as long the solution in question has a gravity of above about 2° Bé. This terminology is in conformance with that usually employed in the art, since caustic solutions which are "spent" as far as refinery operations are concerned are not neutral but still possess considerable alkalinity.

What we claim is:

1. The process of breaking oil and water emulsions which comprises heating the emulsion, adjusting the pH of the water contained in the emulsion to a value between 11 and 13, agitating and heating the emulsion thus formed until the emulsion will break into separate oil and water phases after a short settling period, discontinuing agitating and heating, and allowing the mixture to settle into separate oil and water layers.

2. The process of breaking oil and water emulsions which comprises heating and agitating the emulsion, adjusting the pH of the water contained in the emulsion to a value between 11 and 13, agitating and heating the emulsion thus formed until the emulsion will break into separate oil and water phases after a short settling period, discontinuing agitating and heating, and allowing the mixture to settle into separate oil and water layers.

3. The process of breaking oil and water emulsions which comprises heating and agitating the emulsion, adjusting the pH of the water contained in the emulsion to a value between 11 and 13, continuing to agitate and heat the emulsion thus formed for at least about 30 minutes until the emulsion will break into separate oil and water phases after a short settling period, discontinuing agitating and heating, and allowing the mixture to settle into separate oil and water layers.

4. The process of breaking oil and water emulsions which comprises agitating and heating the emulsions until a temperature of between about 150° and about 210° F. has been reached, adjusting the pH of the water contained in the emulsion to a value between 11 and 13, continuing to agitate and heat the emulsion thus formed until the emulsion will break into separate oil and water phases after a short settling period, discontinuing agitating and heating, and allowing the mixture to settle into separate oil and water layers.

5. The process of breaking oil and water emulsions which comprises agitating and heating the emulsions until a temperature of between about 150° and about 210° F. has been reached, adjusting the pH of the water contained in the emulsion to a value between 11 and 13, continuing to agitate and heat the mixture thus formed for at least about 30 minutes, discontinuing agitating and heating, and allowing the mixture to settle into separate oil and water layers.

6. The process of breaking oil and water emulsions which comprises heating and agitating the emulsion, adjusting the pH of the water contained in the emulsion to a value between 11 and 13 by adding spent refinery caustic solution thereto, continuing to agitate and heat the mixture thus formed until the emulsion will break into separate oil and water phases after a short settling period, discontinuing agitating and heating, and allowing the mixture to settle into separate oil and water layers.

7. The process of breaking oil and water emulsions which comprises heating and agitating the emulsion, adjusting the pH of the water contained in the emulsion to a value between 11 and 13 by adding spent refinery caustic solution thereto, continuing to agitate and heat the mixture thus formed for at least 30 minutes until the emulsion will break into separate oil and water phases after a short settling period, discontinuing agitating and heating, and allowing the mixture to settle into separate oil and water layers.

8. The process of breaking oil and water emulsions which comprises agitating and heating the emulsion until a temperature of between about 150° and about 210° F. has been reached, adjusting the pH of the water contained in the emulsion to a value between 11 and 13 by adding spent refinery caustic solution thereto, continuing to agitate and heat the mixture thus formed until the emulsion will break into separate oil and water phases after a short settling period, discontinuing agitating and heating, and allowing the mixture to settle into separate oil and water layers.

9. The process of breaking oil and water emulsions which comprises heating and agitating the emulsion, adjusting the pH of the water contained in the emulsion to a value between 11 and 13 by adding 2 to 10 per cent by volume of spent refinery caustic solution having a gravity of between about 8° Bé. and 10 Bé., continuing to agitate and heat the mixture thus formed until the emulsion will break into separate oil and water phases after a short settling period, discontinuing agitating and heating, and allowing the mixture to settle into separate oil and water layers.

10. The process of breaking oil and water emulsions which comprises agitating and heating the emulsion until a temperature of between about 150° and about 210° F. has been reached, adjusting the pH of the water contained in the emulsion to a value between 11 and 13 by adding 2 to 10 per cent by volume of a spent refinery caustic solution having a gravity of between about 8° Bé. and about 10° Bé., continuing to agitate and heat the mixture for at least about 30 minutes, discontinuing heating and agitating, and allowing the mixture to settle into separate oil and water layers.

11. The process of breaking oil and water emulsions which comprises heating and agitating the emulsion, adjusting the pH of the water contained in the emulsion to a value between 11 and 13 by adding thereto spent refinery caustic solution which has been pretreated by blowing steam and air therethrough for several hours at a temperature above about 160° F., continuing to agitate and heat the mixture thus formed until the emulsion will break into separate oil and water phases after a short settling period, discontinuing agitating and heating, and allowing the mixture to settle into separate oil and water layers.

12. The process of breaking oil and water emulsions which comprises heating and agitating the emulsion, adjusting the pH of the water contained in the emulsion to a value between 11 and 13 by adding thereto spent refinery caustic solution which has been pretreated by blowing steam and air therethrough for several hours at a temperature above about 160° F., continuing to agitate and heat the mixture thus formed for at least about 30 minutes until the emulsion will break into separate oil and water phases after a short settling period, discontinuing agitating and heating, and allowing the mixture to settle into separate oil and water layers.

13. The process of breaking oil and water emulsions which comprises agitating and heating the emulsion until a temperature between about 150° and about 210° F. has been reached, adjusting the pH of the water contained in the emulsion to a value between 11 and 13 by adding thereto spent refinery caustic solution which has been pretreated by blowing steam and air therethrough for several hours at a temperature above about 160° F., continuing to agitate and heat the mixture thus formed until the emulsion will break into separate oil and water phases after a short settling period, discontinuing agitating and heating, and allowing the mixture to settle into separate oil and water layers.

14. The process of breaking oil and water emulsions which comprises heating and agitating the emulsion, adjusting the pH of the water contained in the emulsion to a value between 11 and 13 by adding thereto spent refinery caustic solution which has been pretreated by blowing steam and air therethrough, at a temperature between about 160° F. and about 235° F. for at least about three hours, continuing to agitate and heat the mixture thus formed until the emulsion will break into separate oil and water phases after a short settling period, discontinuing agitating and heating, and allowing the mixture to settle into separate oil and water layers.

15. The process of breaking oil and water emulsions which comprises heating and agitating the emulsion, adjusting the pH of the water contained in the emulsion to a value between 11 and 13 by adding thereto about 2 to 10 per cent by volume of spent refinery caustic solution which has been pretreated by blowing steam and air therethrough for several hours at a temperature above about 160° F., and which has a gravity of between about 8° Bé. and 10° Bé. prior to pretreating, continuing to agitate and heat the mixture thus formed until the emulsion will break into separate oil and water phases after a short settling period, discontinuing agitating and heating, and allowing the mixture to settle into separate oil and water layers.

16. The process of breaking oil and water emulsions which comprises agitating and heating the emulsion until a temperature of between about 150° and about 210° F. has been reached, adjusting the pH of the water contained in the emulsion to a value between 11 and 13 by adding thereto about 2 to 10 per cent by volume of a spent refinery caustic solution which has been pretreated by blowing steam and air therethrough at a temperature of between about 160° and 235° F. for about three hours, and which has a gravity of about 8° Bé. to 10° Bé. prior to pretreatment, continuing to agitate and heat the mixture thus formed for at least about 30 minutes, discontinuing the heating and agitation, and allowing the mixture to settle into separate oil and water layers.

17. The process of breaking oil and water emulsions which comprises agitating and heating the emulsion until a temperature of about 200° F. has been reached, adjusting the pH of the water contained in the emulsion to a value of between 11 and 13 by adding thereto 2 to 10 per cent by volume of a spent refinery caustic solution having a gravity between about 8° Bé. and 10° Bé., continuing to agitate and heat the mixture thus formed for at least about 30 minutes, discontinuing the heating and agitation, and allowing the mixture to settle into separate oil and water layers.

ARTHUR E. CATANACH.
RALPH P. GULLEY.

REFERENCES CITED

The following references are of record in the file of this patent:

UNITED STATES PATENTS

| Number | Name | Date |
| --- | --- | --- |
| 1,726,309 | Payne et al. | Aug. 27, 1929 |
| 1,726,310 | Payne et al. | Aug. 27, 1929 |
| 1,860,248 | Hyman et al. | May 24, 1932 |
| 2,014,936 | Hendrey et al. | Sept. 17, 1935 |
| 2,143,190 | Fischer et al. | Jan. 10, 1939 |
| 2,284,106 | Stagner | May 26, 1942 |
| 2,439,478 | Roberson | Jan. 30, 1951 |